US008948147B2

(12) United States Patent
Zheng et al.

(10) Patent No.: US 8,948,147 B2
(45) Date of Patent: Feb. 3, 2015

(54) METHOD AND APPARATUS FOR ENABLING ENHANCED CQI UPDATE FREQUENCY

(75) Inventors: Ruiming Zheng, Beijing (CN); Mingxi Fan, San Diego, CA (US); Jiming Guo, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 13/578,589

(22) PCT Filed: Oct. 13, 2010

(86) PCT No.: PCT/CN2010/077700
§ 371 (c)(1),
(2), (4) Date: Sep. 18, 2012

(87) PCT Pub. No.: WO2011/110023
PCT Pub. Date: Sep. 15, 2011

(65) Prior Publication Data
US 2013/0195097 A1  Aug. 1, 2013

(30) Foreign Application Priority Data

Mar. 11, 2010 (WO) ................ PCT/CN2010/070981

(51) Int. Cl.
*H04W 4/00* (2009.01)
*H04W 24/02* (2009.01)
*H04W 72/12* (2009.01)

(52) U.S. Cl.
CPC .......... *H04W 24/02* (2013.01); *H04W 72/1284* (2013.01)
USPC ......................................... 370/338; 370/342

(58) Field of Classification Search
CPC ..... H04W 24/00; H04W 24/02; H04W 24/10; H04W 72/1278; H04W 72/1284; H04W 72/1289
USPC .................................. 370/241–252, 329–343
See application file for complete search history.

(56) References Cited

U.S. PATENT DOCUMENTS

| 2005/0233754 | A1* | 10/2005 | Beale ........................ 455/452.2 |
| 2006/0281461 | A1* | 12/2006 | Kwun et al. ................ 455/436 |
| 2007/0019567 | A1* | 1/2007 | Padovani et al. ............. 370/252 |
| 2007/0032199 | A1* | 2/2007 | Chang et al. ................. 455/69 |
| 2009/0046805 | A1  | 2/2009 | Kim et al. |

(Continued)

FOREIGN PATENT DOCUMENTS

| CN | 101133615 A | 2/2008 |
| CN | 101159951   | 4/2008 |
| CN | 101242566 A | 8/2008 |

(Continued)

OTHER PUBLICATIONS

International Search Report and Written Opinion—PCT/CN2010/070981, International Search Authority—European Patent Office—Dec. 9, 2010.

(Continued)

*Primary Examiner* — Kan Yuen
(74) *Attorney, Agent, or Firm* — Kristine U. Ekwueme

(57) ABSTRACT

A method and apparatus for facilitating downlink data transmission in a TD-SCDMA system is provided. The method may comprise receiving, from a Node B, a channel quality indicator (CQI) request, wherein the CQI request is not associated with a payload transmission.

24 Claims, 9 Drawing Sheets

(56) References Cited

U.S. PATENT DOCUMENTS

2009/0238086 A1 9/2009 Ringstrom et al.
2009/0238121 A1* 9/2009 Kotecha ................ 370/329

FOREIGN PATENT DOCUMENTS

| CN | 101494876 | | 7/2009 |
|---|---|---|---|
| EP | 1821470 | A1 | 8/2007 |
| KR | 20090075441 | A | 7/2009 |
| WO | 2006073271 | A1 | 7/2006 |
| WO | 2010020478 | A1 | 2/2010 |

OTHER PUBLICATIONS

International Search Report and Written Opinion—PCT/CN2010/077700, International Search Authority—European Patent Office—Dec. 23, 2010.

* cited by examiner

US 8,948,147 B2

METHOD AND APPARATUS FOR ENABLING ENHANCED CQI UPDATE FREQUENCY

CROSS-REFERENCE TO RELATED APPLICATION(S)

This application claims the benefit of International Patent Application No. PCT/CN2010/070981, entitled "METHOD AND APPARATUS FOR ENABLING ENHANCED CQI UPDATE FREQUENCY," filed on Mar. 11, 2010, which is expressly incorporated by reference herein in its entirety.

BACKGROUND

1. Field

Aspects of the present disclosure relate generally to wireless communication systems, and more particularly, for enabling enhanced channel quality indicator (CQI) update frequency in a system, such as a time division synchronous code division multiple access (TD-SCDMA) high speed downlink packet access (HSDPA) system.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and TD-SCDMA. For example, China is pursuing TD-SCDMA as the underlying air interface in the UTRAN architecture with its existing GSM infrastructure as the core network. The UMTS also supports enhanced 3G data communications protocols, such as HSDPA, which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with enabling an enhanced CQI update frequency in TD-SCDMA HSDPA system. The method can comprise receiving, from a Node B, a CQI request, wherein the CQI request is not associated with a payload transmission.

Yet another aspect relates to an apparatus. The apparatus can include means for receiving, from a Node B, a CQI request, wherein the CQI request is not associated with a payload transmission, means for generating a CQI response, wherein the CQI response indicates a maximum data rate at which a UE may receive, and means for transmitting the CQI response to the Node B.

Still another aspect relates to a computer program product comprising a computer-readable medium. The computer-readable medium can include code for receiving, from a Node B, a CQI request, wherein the CQI request is not associated with a payload transmission.

Another aspect relates to an apparatus for wireless communications. The apparatus can include a receiver configured to receive, from a Node B, a CQI request, wherein the CQI request is not associated with a payload transmission. The apparatus may also include at least one processor configured to generate a CQI response, wherein the CQI response indicates a maximum data rate at which a UE may receive. The apparatus may further include a transmitter configured to transmit the CQI response at a defined time instance after the CQI request is received.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
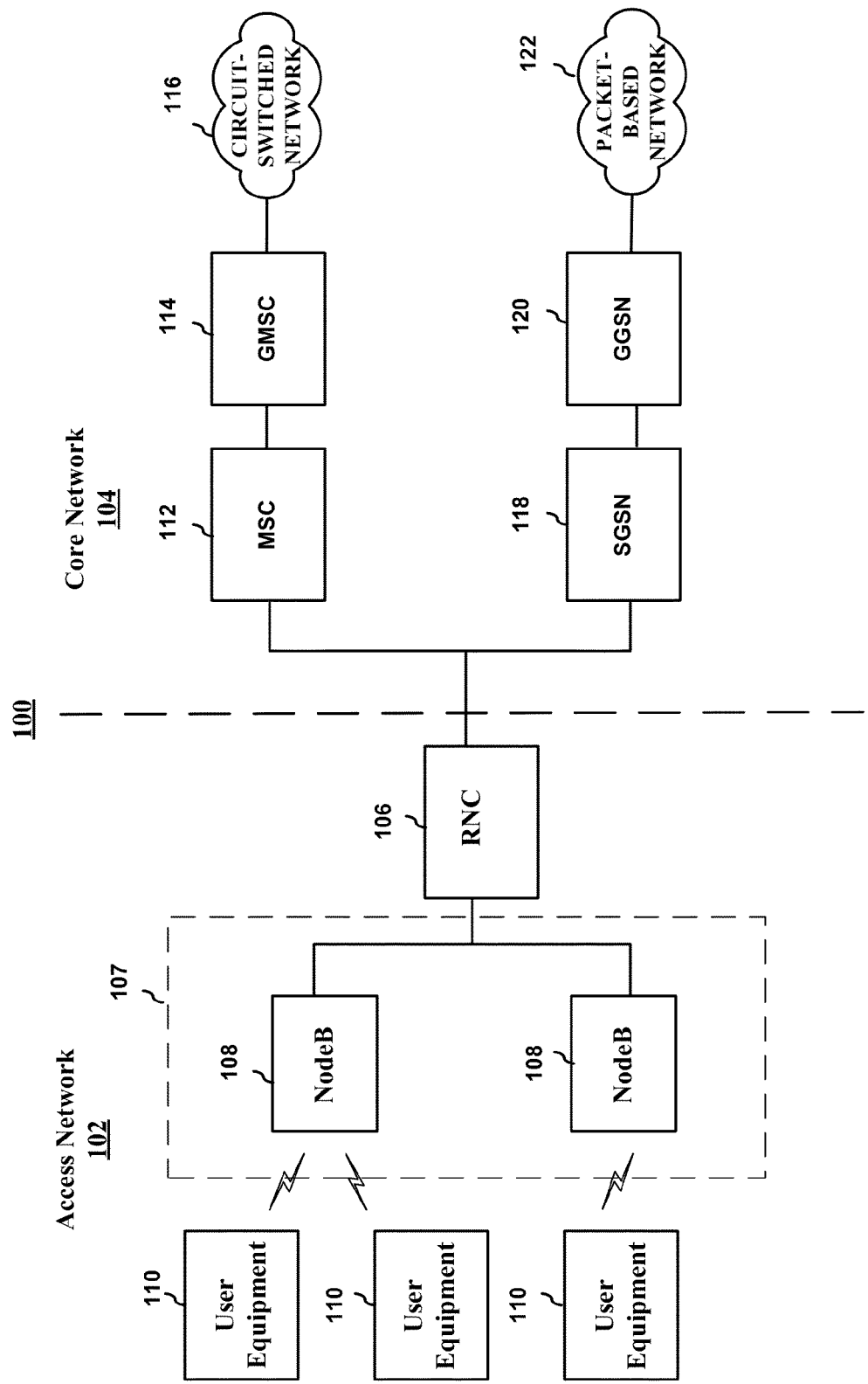
FIG. 1 is a block diagram conceptually illustrating an example of a telecommunications system.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a (radio access network) RAN 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine the UE's location and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the UL and DL between a Node B 108 and a UE 110, but divides UL and DL transmissions into different time slots in the carrier.

Figure 2:
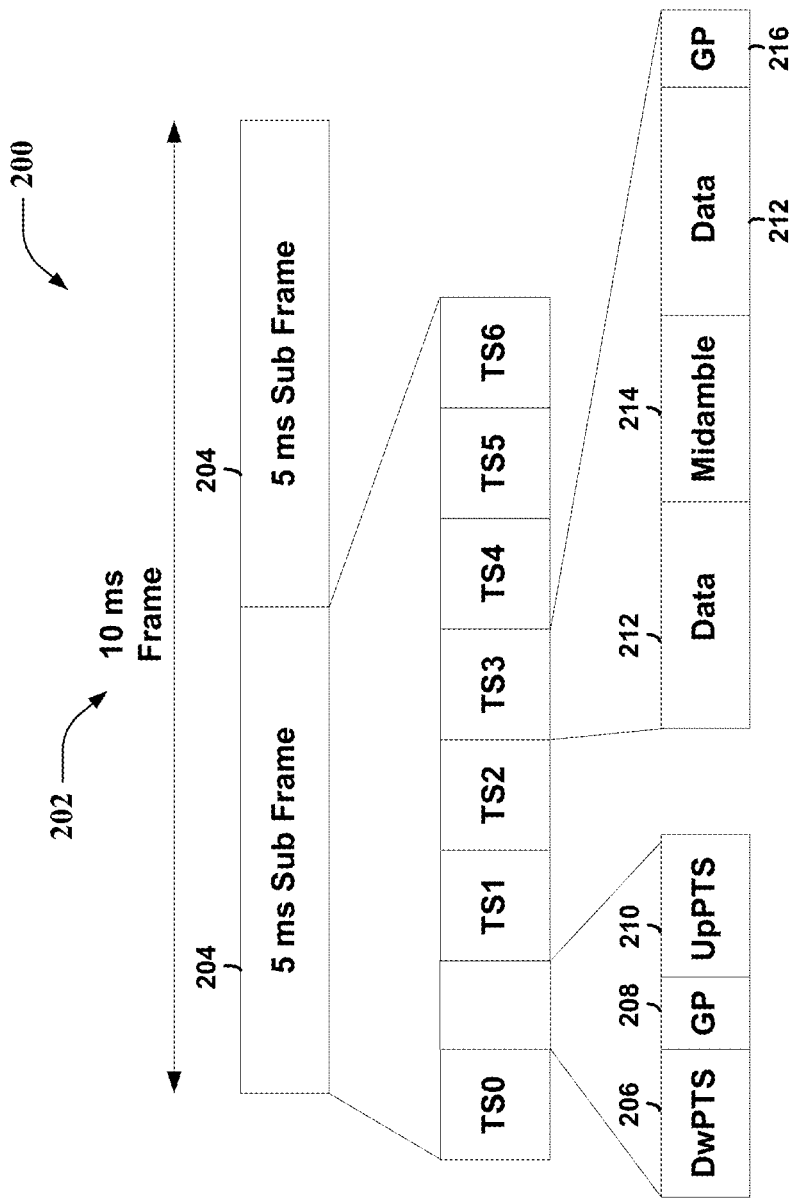
FIG. 2 is a block diagram conceptually illustrating an example of a frame structure in a telecommunications system.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a GP 216. The midamble 214 may be used for features, such as channel estimation, while the GP 216 may be used to avoid inter-burst interference.

Figure 3:
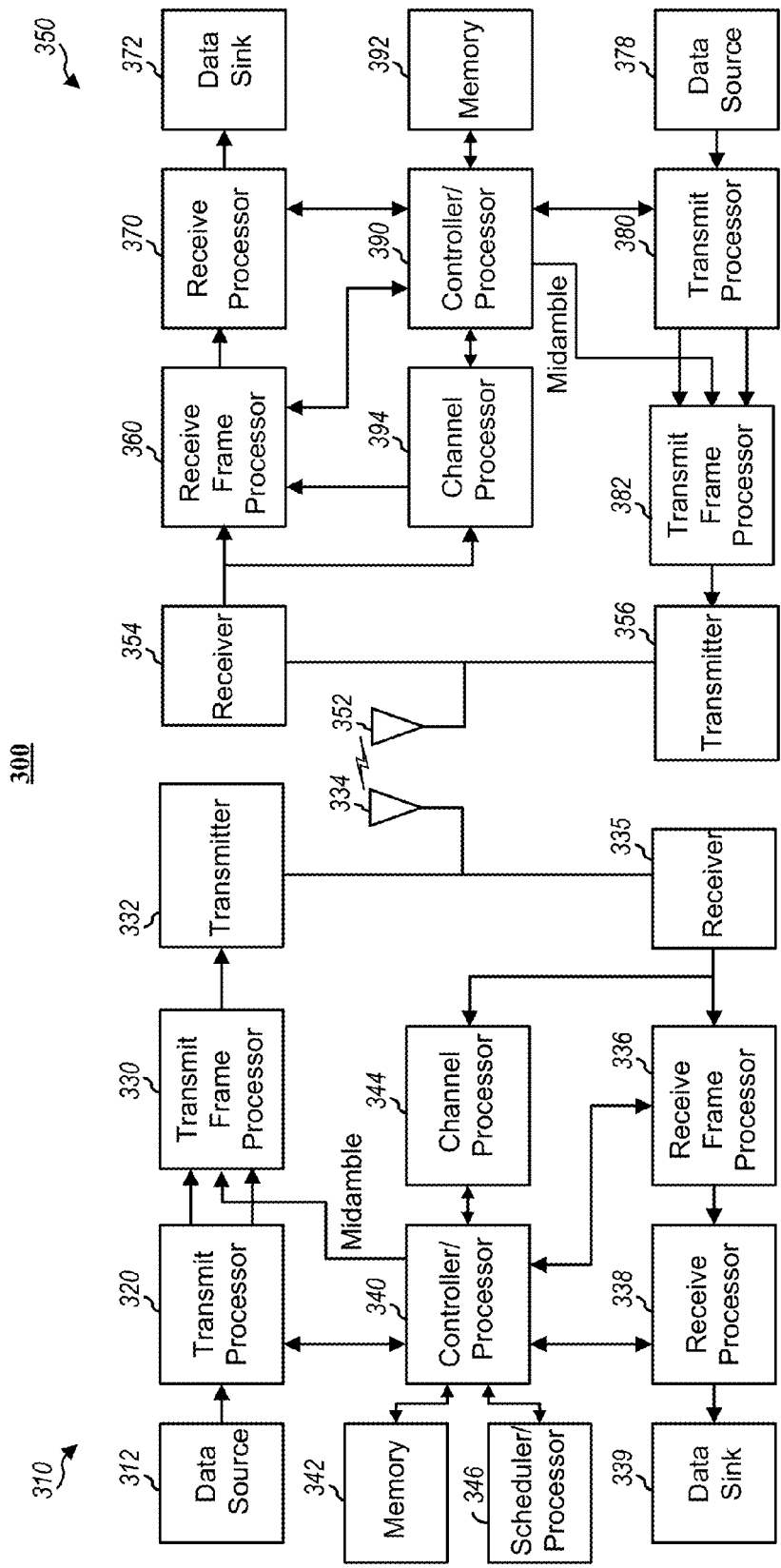
FIG. 3 is a block diagram conceptually illustrating an example of a Node B in communication with a UE in a telecommunications system.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receiver processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an ACK and/or NACK protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

Figure 6:
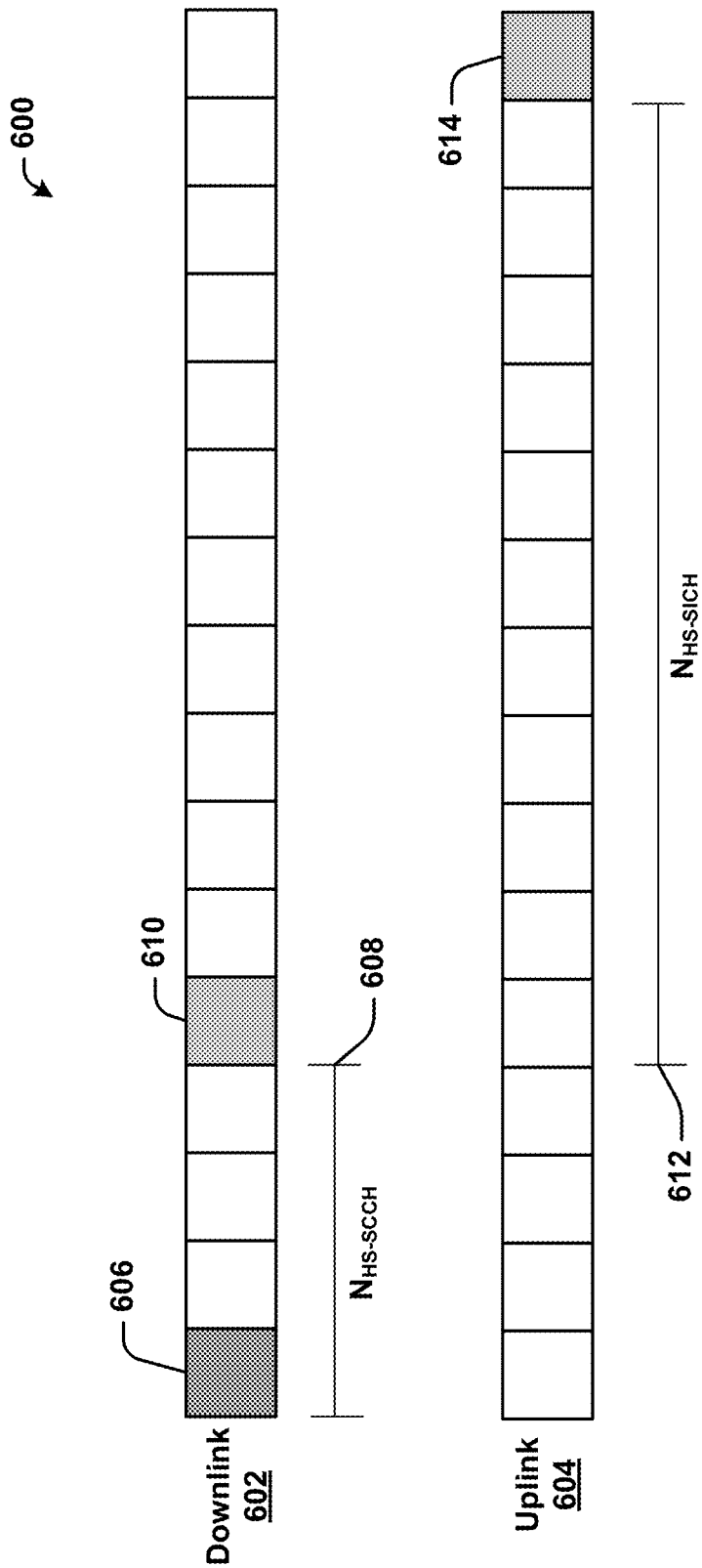
FIG. 6 is a block diagram conceptually illustrating communications and associated timing in an aspect of the present disclosure.

In one aspect, controller/processors 340 and 390 may enable enhanced CQI update frequency. Generally, in a TD-SCDMA system, a physical layer process for high-speed downlink packet-switched data transmission may include multiple aspects. In an aspect, such as depicted in FIG. 6, only an active UE may provide CQI results. As such, the aspect of CQI transmission may result in lower system throughput and airlink utilization in the downlink due to the lack of adequate channel information at the Node B scheduler.

In one configuration, the apparatus 350 for wireless communication includes means for receiving, from a Node B, a CQI request, wherein the CQI request is not associated with a payload transmission, means for generating a CQI response, and means for transmitting the CQI response to the Node B. In one aspect, the means for receiving may include receiver 354. In another aspect, the means for generating may include controller/processor 390. In still another aspect, the means for transmitting may include transmitter 356. In another configuration, the apparatus 350 includes means for transmitting the CQI response at a defined time instance after the CQI request is received. In another configuration, the apparatus 350 includes means for receiving the CQI request from the Node B which is not actively serving a UE. In another configuration, the apparatus 350 includes means for receiving using a high speed shared control channel (HS-SCCH). In another configuration, the apparatus 350 includes means for transmitting using a HS-SICH. In one aspect, the aforementioned means may be the processor(s) 360, 380 and/or 390 configured to perform the functions recited by the aforementioned means. In another aspect, the aforementioned means may be a module or any apparatus configured to perform the functions recited by the aforementioned means.

In a CQI update procedure, the Node B may also send one or more "CQI-request" using HS-SCCHs with a pre-determined open-loop power along with the HS-SCCH associated with a given scheduler assignment. In such an aspect, the format of the CQI-update (e.g., blanking) HS-SCCH may be the same as a regular HS-SCCH, except the payload ID in the blanking HS-SCCH may be set to zero. Such a setting of the payload ID to zero may be accomplished through a change in the TD-SCDMA $3^{rd}$ generation standard. As such, there will be no data packet served in association with CQI-update HS-SCCH. In one aspect, the transmitted power my set as a predetermined open loop power at the Node B.

In operation, upon receiving the CQI-Update HS-SCCH, the UE may feedback the CQI during a time instance determined as if the CQI-Update HS-SCCH carried a scheduling assignment, (e.g., in accordance to timeline in FIG. 6). In further operation, a CQI fed back by the UE with the CQI-Update HS-SCCH may be a maximum data rate that the UE can receive reliably, assuming the same power and code/time dimension used for the given HS-SCCH channel. In one aspect, if the UE could not decode the CQI-Update HS-SCCH correctly then there may be no feedback received in response to the CQI-Update HS-SCCH.

By way of example and not in limitation, a downlink system simulation evaluating the data throughput impact of CQI-Update HS-SCCH's is described. A comparison of TD-HSDPA downlink throughput with and without CQI-Update HS-SCCH is shown in Table 1. Table 1 depicts three cases: without CQI-Request HS-SCCH, with CQI-Request HS-SCCH, and Ideal CQI feedback assuming each UE provides a feedback CQI every 5 ms as an upper bound. Table 1 further depicts throughput comparisons for the cases of 1, 4, 8 and 16 UEs per cell. As seen in Table 1, performance gains (50-60%) are observed for the case with CQI-request HS-SCCH compared to the without case when there are multiple UEs per cell.

TABLE 1

| Cell Throughput (kbps) | 1 UE per Cell | 4 UEs per Cell | 8 UEs per Cell | 16 UEs per Cell |
| --- | --- | --- | --- | --- |
| Without CQI-Request HS-SCCH | 220.254 | 177.6803 | 171.9517 | 157.8351 |
| With CQI-Request HS-SCCH | 220.2303 | 289.6995 | 267.0366 | 239.097 |
| Ideal CQI Feedback (Upper bound) | 234.0376 | 329.709 | 358.8057 | 353.973 |

Figure 4:
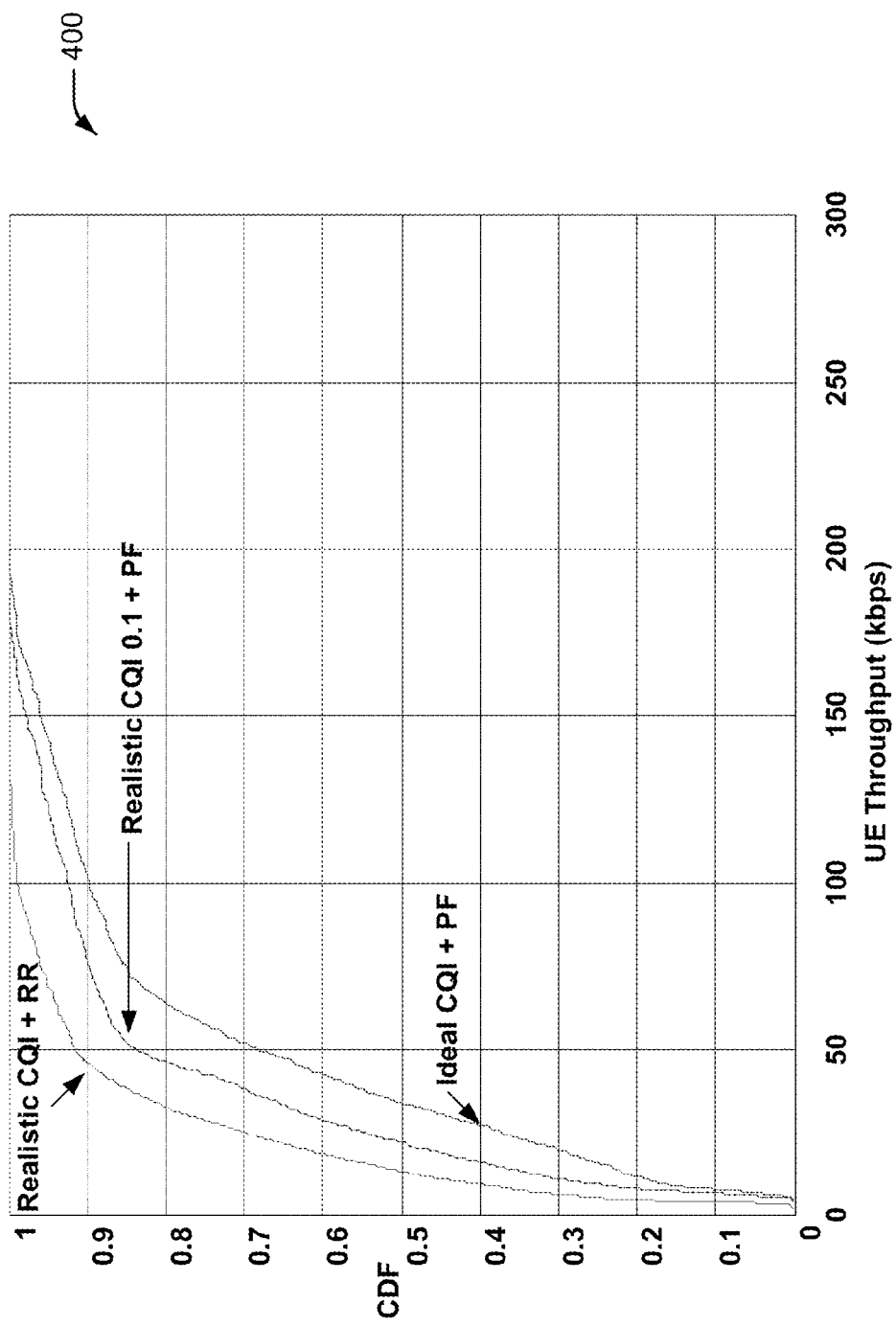
FIG. 4 is an exemplary graph depicting a UE throughput CDF Comparison for a TD-HSDPA system with and without enhanced CQI-Request HS-SCCH and an Upper Bound according to an aspect.

Further, an example UE throughput cumulative distribution function (CDF) is depicted in FIG. 4 to illustrate the benefits using a CQI request HS-SCCH may provide to UEs in a system 400.

Figure 5:
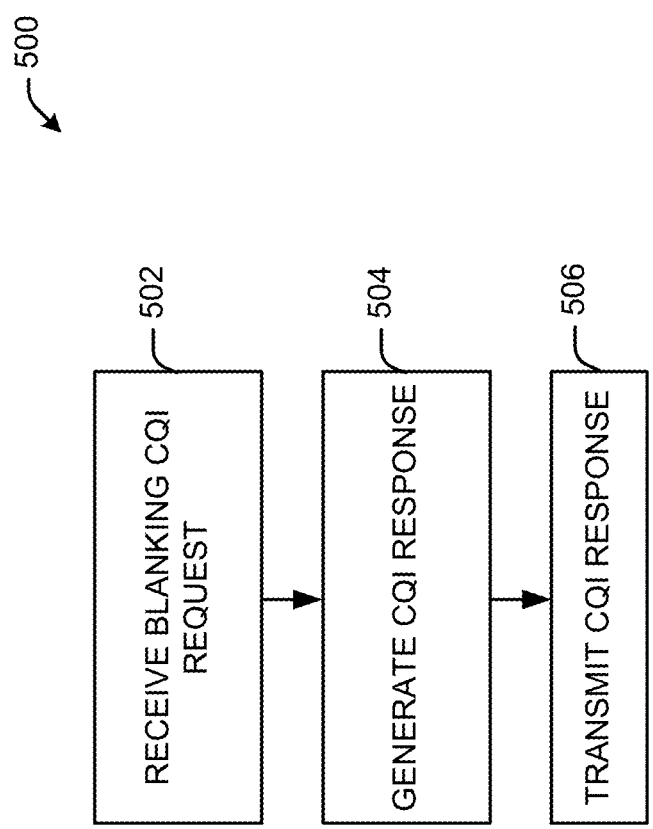
FIG. 5 is a functional block diagram conceptually illustrating example blocks executed to implement the functional characteristics of one aspect of the present disclosure.

FIG. 5 illustrates various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 5 is a functional block diagram 500 illustrating example blocks executed in conducting wireless communication according to one aspect of the present disclosure. In block 502, a UE may receive a blanking CQI request. In one aspect, a blanking CQI request is not accompanied by a payload and/or payload ID. In another aspect, the CQI request is received by a UE which is not actively communicatively with a Node B. In still another aspect, the CQI request may be received using a HS-SCCH. In yet another aspect, the CQI request may include a define open-loop power value, and code and time dimension values. In block 504, the UE may generate a CQI response. In block 506, the UE may transmit the generated CQI response. In one aspect, the CQI response may be transmitted at a defined time instance after the CQI request is received. In another aspect, the CQI response is transmitted using a high speed shared information control channel (HS-SICH).

Turning now to FIG. 6 is a block diagram conceptually illustrating communications and associated timing in a system 600 is illustrated. As depicted in FIG. 6, downlink 602 and uplink 604 time slots are illustrated. Generally, in a time division high speed downlink packet access (TD-HSDPA) system 600, a physical layer process for high-speed downlink packet-switched data transmission may include multiple aspects. In one aspect, upon scheduling a particular UE, the Node B transmits a HS-SCCH directed towards the UE in one subframe 606. In one aspect, after a defined number of slots 608 (e.g., five slots) after HS-SCCH transmission 606, the Node B may transmit the corresponding data packet in HS-PDSCH 610 according to the payload size, modulation format, and resource utilization (time/code space) specified in HS-SCCH 606. In one aspect, a defined number of slots 612 (e.g., 9 slots) after the completion of HS-PDSCH, the UE may transmit HS-SICH to the Node B in the uplink which consists of an acknowledgement 614 for the particular packet and CQI information. In such an aspect, the CQI information the UE may feedback may provide the Node B with the maximum data rate, in terms of block size and modulation format that the UE could reliably receive, assuming the same code, time and power resource allocated to the received data packet. In an aspect, such as depicted in FIG. 6, only an active UE may provide CQI results. As such, the aspect of CQI transmission may result in lower system throughput and airlink utilization in the downlink due to the lack of adequate channel information at the Node B scheduler.

Figure 7:
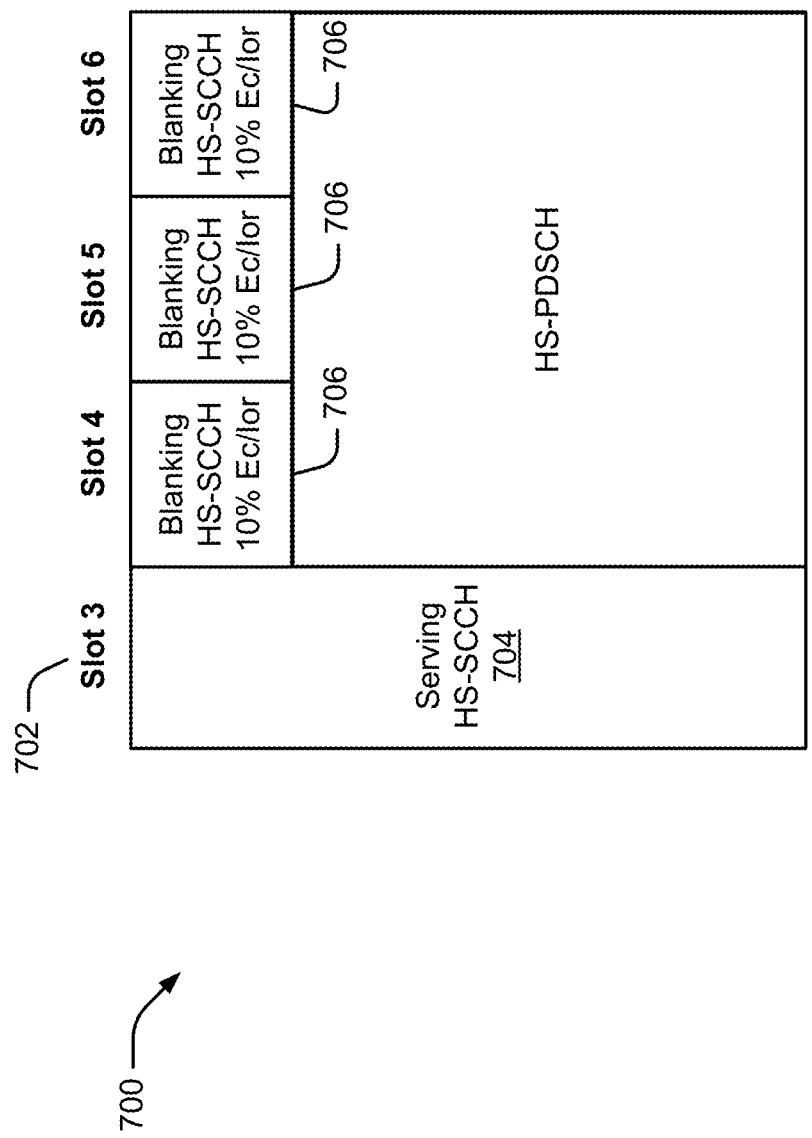
FIG. 7 is a block diagram conceptually illustrating communications over multiple time slots in an aspect of the present disclosure.

With reference now to FIG. 7, a block diagram conceptually illustrating communications over multiple time slots a system 700 is presented. System 700 may include multiple time slots 702. Generally, HS-SCCH channels may be transmitted via power control to ensure adequate error/erasure performance at a UE receiver. Further the Node B may be actively communicating using one of the multiple time slots 702. In such an aspect, a serving HS-SCCH 704 may be transmitted to the active UE. Thereafter, in one aspect, the Node B may transmit blanking HS-SCCHs 706 to various other UEs during subsequence available time slots. In such an aspect, the blanking HS-SCCH 706 transmissions may not accompanied by a payload ID. Further, in the depicted example, the blanking HS-SCCH 706 in this case assumes 10% of Ec/Ior. In aspect, a CQI fed back by the UE with the CQI-Update HS-SCCH may be a maximum data rate that the UE can receive reliably, assuming the same power and code/time dimension used for the given HS-SCCH channel.

Figure 8:
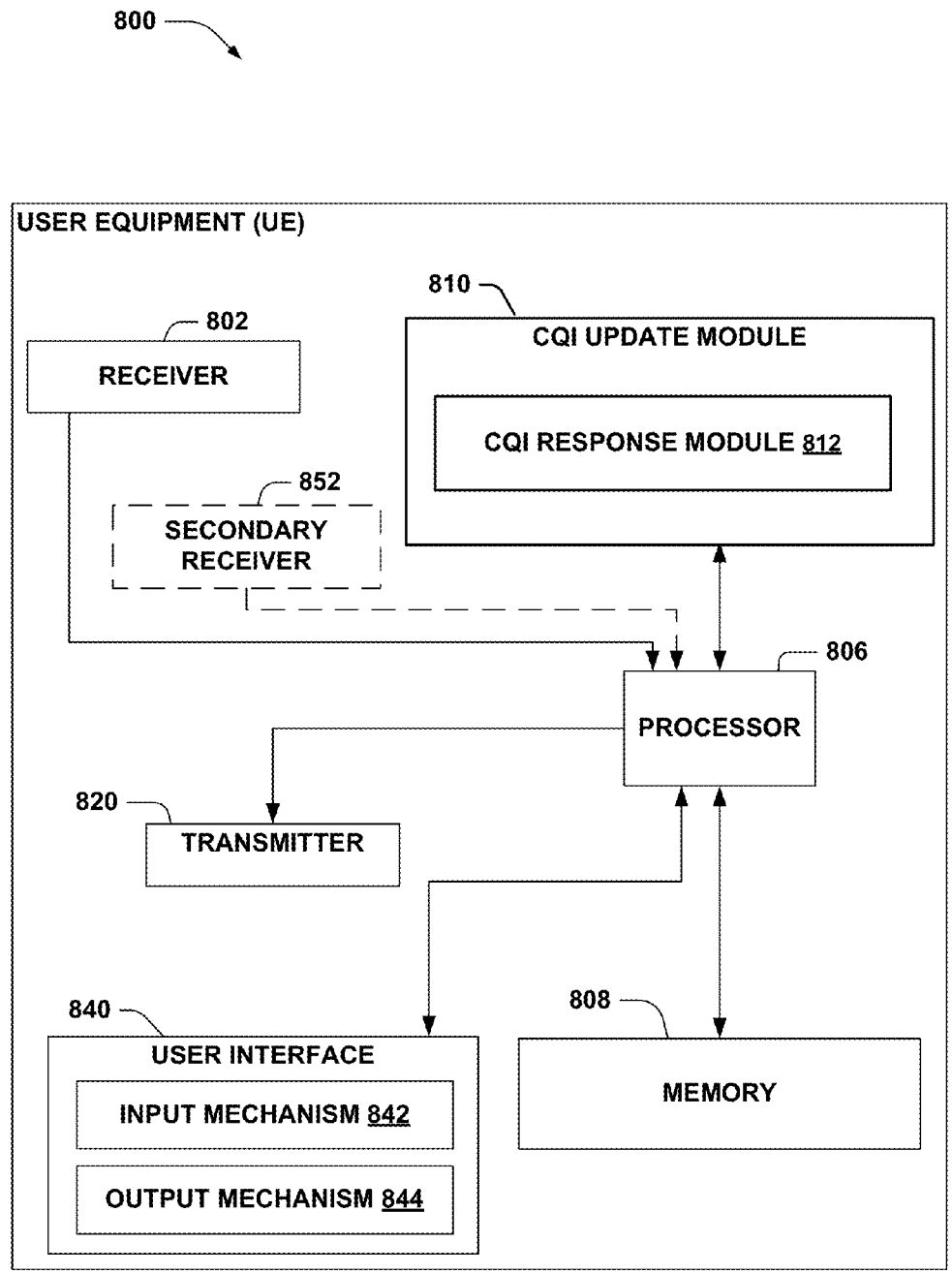
FIG. 8 is a block diagram of an exemplary wireless communications device configured to enable enhanced CQI update frequency according to an aspect.

With reference now to FIG. 8, an illustration of a UE 800 (e.g., a client device, wireless communications device (WCD), etc.) that can facilitate obtaining resource allocations is presented. UE 800 comprises receiver 802 that receives one or more signal from, for instance, one or more receive antennas (not shown), performs typical actions on (e.g., filters, amplifies, downconverts, etc.) the received signal, and digitizes the conditioned signal to obtain samples. Receiver 802 can further comprise an oscillator that can provide a carrier frequency for demodulation of the received signal and a demodulator that can demodulate received symbols and provide them to processor 806 for channel estimation. In one aspect, UE 800 may further comprise secondary receiver 852 and may receive additional channels of information.

Processor 806 can be a processor dedicated to analyzing information received by receiver 802 and/or generating information for transmission by one or more transmitters 820 (for ease of illustration, only one transmitter is shown), a processor that controls one or more components of UE 800, and/or a processor that both analyzes information received by receiver 802 and/or receiver 852, generates information for transmission by transmitter 820 for transmission on one or more transmitting antennas (not shown), and controls one or more components of UE 800.

UE 800 can additionally comprise memory 808 that is operatively coupled to processor 806 and that can store data to be transmitted, received data, information related to available channels, data associated with analyzed signal and/or interference strength, information related to an assigned channel, power, rate, or the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 808) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 808 of the subject systems and methods is intended to comprise, without being limited to, these and any other suitable types of memory.

UE 800 can further comprise CQI update module 810 which may be operable to facilitate CQI processing for UE 800. In one aspect, CQI update module 810 may include CQI response module 812. In one aspect, CQI response module 812 is operable to provide a CQI feedback indicating a maximum data rate that the UE can receive reliably, assuming the same power and code/time dimension used for the given HS-SCCH channel. In one aspect, if the UE could not decode the CQI-Update HS-SCCH correctly then there may be no feedback transmitted in response to the CQI-Update HS-SCCH. Operation of such CQI processing is depicted in FIG. 5.

Moreover, in one aspect, processor 806 may provide the means for receiving, from a serving Node B, a CQI request, wherein the CQI request is not associated with a payload transmission, means for generating a CQI response, wherein the CQI response indicates a maximum data rate at which a UE may receive, and means for transmitting the CQI response to the serving Node B.

Additionally, UE 800 may include user interface 840. User interface 840 may include input mechanisms 842 for generating inputs into UE 800, and output mechanism 842 for generating information for consumption by the user of UE 800. For example, input mechanism 842 may include a mechanism such as a key or keyboard, a mouse, a touchscreen display, a microphone, etc. Further, for example, output mechanism 844 may include a display, an audio speaker, a haptic feedback mechanism, a Personal Area Network (PAN) transceiver etc. In the illustrated aspects, output mechanism 844 may include a display operable to present content that is in image or video format or an audio speaker to present content that is in an audio format.

Figure 9:
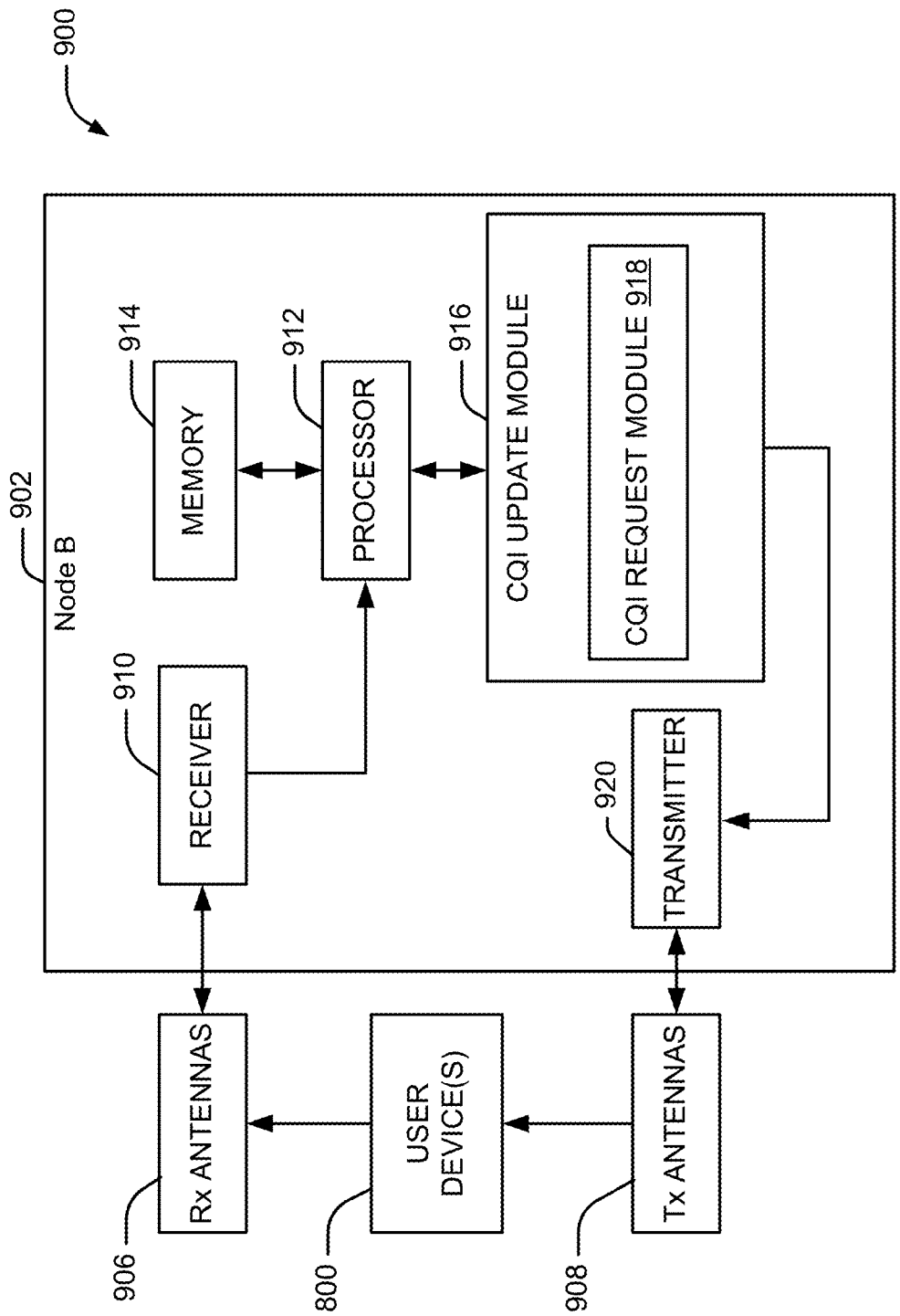
FIG. 9 is a block diagram depicting the architecture of a Node B configured to enable enhanced CQI update frequency according to an aspect.

With reference to FIG. 9, an example system 900 that comprises a Node B 902 with a receiver 910 that receives signal(s) from one or more user devices 800 through a plurality of receive antennas 906, and a transmitter 920 that transmits to the one or more user devices 900 through a plurality of transmit antennas 908. Receiver 910 can receive information from receive antennas 906. Symbols may be analyzed by a processor 912 that is similar to the processor described above, and which is coupled to a memory 914 that stores information related to data processing. Processor 912 is further coupled to a CQI update module 916 that facilitates communications with one or more respective user devices 800 for obtaining CQI information from non-active user devices 800.

In one aspect, CQI update module 916 may be operable to enable enhanced CQI update frequency in a network 900. Further, CQI update module 916 may include CQI request module 918. In one aspect, CQI request module 918 may be operable to transmit blanking HS-SCCHs to various other UEs during subsequence available time slots. In such an aspect, the blanking HS-SCCH transmissions may not accompanied by a payload ID.

Several aspects of a telecommunications system has been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, HSDPA, High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   receiving, from a Node B, a channel quality indicator (CQI) request, wherein the CQI request is associated with a payload ID set to zero;
   generating a CQI response for transmission to the Node B in response to the CQI request, wherein the CQI response indicates a maximum data rate associated with downlink transmission from the Node B; and
   transmitting the CQI response to the Node B at a defined time instance after the CQI request is received.

2. The method of claim 1, wherein the receiving further comprises receiving the CQI request from the Node B which is not actively serving a UE.

3. The method of claim 1, wherein the CQI request includes a define open-loop power value, and code and time dimension values.

4. The method of claim 1, wherein the receiving further comprises receiving using a high speed shared control channel (HS-SCCH).

5. The method of claim 1, wherein the transmitting further comprises transmitting using a high speed shared information control channel (HS-SICH).

6. The method of claim 1, wherein the wireless communication is performed in a time division high speed downlink packet access (TD-HSDPA) system.

7. An apparatus for wireless communication, comprising:
   means for receiving, from a Node B, a CQI request, wherein the CQI request is associated with a payload ID set to zero;
   means for generating a CQI response for transmission to the Node B in response to the CQI request, wherein the CQI response indicates a maximum data rate associated with downlink transmission from the Node B; and
means for transmitting the CQI response to the Node B at a defined time instance after the CQI request is received.

8. The apparatus of claim 7, wherein the means for receiving further comprises means for receiving the CQI request from the Node B which is not actively serving a UE.

9. The apparatus of claim 7, wherein the CQI request includes a define open-loop power value, and code and time dimension values.

10. The apparatus of claim 7, wherein the means for receiving further comprises means for receiving using a HS-SCCH.

11. The apparatus of claim 7, wherein the means for transmitting further comprises means for transmitting using a HS-SICH.

12. The apparatus of claim 7, wherein the wireless communication is performed in a TD-HSDPA system.

13. A computer program product, comprising:
a non-transitory computer-readable medium comprising code for:
receiving, from a Node B, a CQI request, wherein the CQI request is associated with a payload ID set to zero;
generating a CQI response for transmission to the Node B in response to the CQI request, wherein the CQI response indicates a maximum data rate associated with downlink transmission from the Node B; and
transmitting the CQI response to the Node B at a defined time instance after the CQI request is received.

14. The computer program product of claim 13, wherein the non-transitory computer-readable medium further comprises code for:
receiving the CQI request from the Node B which is not actively serving a UE.

15. The computer program product of claim 13, wherein the CQI request includes a define open-loop power value, and code and time dimension values.

16. The computer program product of claim 13, wherein the non-transitory computer-readable medium further comprises code for:
receiving using a HS-SCCH.

17. The computer program product of claim 13, wherein the non-transitory computer-readable medium further comprises code for:
transmitting using a HS-SICH.

18. The computer program product of claim 13, wherein the wireless communication is performed in a TD-HSDPA system.

19. An apparatus for wireless communication, comprising:
a receiver configured to receive, from a Node B, a CQI request, wherein the CQI request is associated with a payload ID set to zero;
at least one processor; and
a memory coupled to the at least one processor,
wherein the at least one processor is configured to:
generate a CQI response for transmission to the Node B in response to the CQI request, wherein the CQI response indicates a maximum data rate associated with downlink transmission from the Node B, and
a transmitter configured to transmit the CQI response to the Node B at a defined time instance after the CQI request is received.

20. The apparatus of claim 19, wherein the Node B is a Node B which is not actively serving by the UE.

21. The apparatus of claim 19, wherein the CQI request includes a define open-loop power value, and code and time dimension values.

22. The apparatus of claim 19, wherein the receiver is further configured to receive using a HS-SCCH.

23. The apparatus of claim 19, wherein transmitter is further configured to transmit using a HS-SICH.

24. The apparatus of claim 19, wherein the wireless communication is performed in a TD-HSDPA system.

* * * * *